United States Patent
Flaming et al.

(10) Patent No.: US 8,864,437 B1
(45) Date of Patent: Oct. 21, 2014

(54) STACKING APPARATUSES AND/OR EQUIPMENT FOR OBJECTS HAVING FOLDABLY-ATTACHED PARTS OR FLAPS AND RELATED METHODS

(75) Inventors: Max Flaming, Fresno, CA (US); Michael Reitz, Visalia, CA (US)

(73) Assignee: Maxco Supply, Inc., Parlier, CA (US)

( * ) Notice: Subject to any disclaimer, the term of this patent is extended or adjusted under 35 U.S.C. 154(b) by 263 days.

(21) Appl. No.: 13/218,244

(22) Filed: Aug. 25, 2011

Related U.S. Application Data (60) Provisional application No. 61/379,103, filed on Sep. 1, 2010.

(51) Int. Cl.
| | | |
|---|---|---|
| *B31B 3/00* | (2006.01) | |
| *B31B 1/46* | (2006.01) | |
| *B65H 31/26* | (2006.01) | |
| *B65G 57/30* | (2006.01) | |
| *B65H 29/46* | (2006.01) | |

(52) U.S. Cl.
CPC ... *B31B 3/00* (2013.01); *B31B 1/46* (2013.01); *B65H 31/26* (2013.01); *B65G 57/302* (2013.01); *B65H 29/46* (2013.01)
USPC .................... 414/788.2; 414/795.3

(58) Field of Classification Search
CPC .. B65G 59/062; B65G 59/063; B65G 57/308; B65G 59/066; B65G 59/101; B65G 59/103; B65G 59/105; A47F 1/10; Y10S 414/112
USPC ............... 206/255; 221/238, 301; 414/788.2, 414/788.3, 794.9, 795, 795.1, 795.2, 795.3, 414/795.6, 797.4, 797.5, 797.6, 797.7, 414/797.8, 798, 798.1, 798.4, 933; 493/174, 183, 70; 53/376.2, 376.7, 53/377.2, 382.1, 387.2, 377.6, 381.7, 53/382.2; 74/89, 99 R
See application file for complete search history.

(56) References Cited

U.S. PATENT DOCUMENTS

| | | | | |
|---|---|---|---|---|
| 2,398,200 | A * | 4/1946 | Van Voorhis | 493/143 |
| 2,871,640 | A * | 2/1959 | Truini | 53/382.1 |
| 3,067,559 | A * | 12/1962 | Lawrence et al. | 53/382.1 |
| 3,145,518 | A * | 8/1964 | Ricca | 53/387.2 |
| 3,165,033 | A * | 1/1965 | Bambra | 493/176 |
| 3,419,186 | A * | 12/1968 | Cease | 221/221 |

(Continued)

FOREIGN PATENT DOCUMENTS

| | | | | | |
|---|---|---|---|---|---|
| JP | 56023129 | A | * | 3/1981 | ............. B65G 59/06 |
| JP | 61254423 | A | * | 11/1986 | |
| JP | 04159924 | A | * | 6/1992 | |
| JP | 2006240845 | A | * | 9/2006 | |

*Primary Examiner* — Gregory Adams
(74) *Attorney, Agent, or Firm* — Andrew D. Fortney; Central California IP Group, P.C.

(57) ABSTRACT

Stacking apparatuses and/or equipment for stacking objects with foldably-attached parts (e.g., containers with flaps), methods of stacking objects with foldably-attached parts, and methods of manufacturing stacking apparatuses and/or equipment for stacking objects with foldably-attached parts. The stacking apparatuses have at least two flap guide assemblies with one or more arms and one or more flap guides, one or more cams, each cam having a cam track and a cam follower, and a lift assembly having a lifting mechanism to move the next object to be stacked into a stack of substantially identical objects. The present stacking apparatuses stack objects in a manner that avoids jams or obstructions due to irregular folding and/or obstruction of the stacking process by the foldably-attached parts.

18 Claims, 9 Drawing Sheets

(56) References Cited

U.S. PATENT DOCUMENTS

| | | | |
|---|---|---|---|
| 3,677,439 A * | 7/1972 | Bosworth et al. | 221/251 |
| 3,782,591 A * | 1/1974 | Fries | 221/213 |
| 3,858,732 A * | 1/1975 | Kemper | 414/797.5 |
| 3,921,371 A * | 11/1975 | Lee | 53/376.5 |
| 4,043,460 A * | 8/1977 | Steele | 414/795.2 |
| 4,295,839 A * | 10/1981 | Baker et al. | 493/143 |
| 4,701,092 A * | 10/1987 | Reynaud et al. | 414/796.1 |
| 5,738,485 A * | 4/1998 | Bedard et al. | 414/795.4 |
| 6,402,456 B1 * | 6/2002 | van Walderveen et al. | 414/796 |

* cited by examiner

STACKING APPARATUSES AND/OR EQUIPMENT FOR OBJECTS HAVING FOLDABLY-ATTACHED PARTS OR FLAPS AND RELATED METHODS

RELATED APPLICATIONS

This application claims the benefit of U.S. Provisional Patent Application No. 61/379,103, filed Sep. 1, 2010, incorporated by reference herein in its entirety.

FIELD OF THE INVENTION

The present invention generally relates to the field of stacking apparatuses and/or equipment, and methods of manufacturing and using the same. More specifically, embodiments of the present invention pertain to stacking apparatuses and/or equipment that can stably and vertically stack objects (e.g., containers, trays or boxes) having foldably-attached parts, flaps and/or panels in a manner that avoids jams or complications due to irregular folding or obstruction of the stacking process by such parts, flaps or panels. Embodiments of the present invention also relate to methods of stacking objects and methods of manufacturing apparatuses and/or equipment to stack such objects.

DISCUSSION OF THE BACKGROUND

In many areas of commerce, containers and, in particular, stackable containers are used to hold and/or transport products. To facilitate handling, it is common practice to stack several containers (e.g., trays or boxes) for transportation and/or storage prior to and/or after use. For produce (e.g., fresh fruits and vegetables), such stackable containers are particularly important. Rigid boxes or Bliss-type boxes are commonly used for storing and shipping produce and other goods. These containers and other conventional packing and/or storage containers or objects may include foldably-attached, free-moving parts, flaps and/or panels that can be used to seal or partially cover the top of the containers or objects after they have been filled with material or items. During assembly of such containers and/or objects, the lid flaps and/or other foldably-attached parts are generally left unfolded, such that the top of the container or object remains open. This allows the containers or objects to be vertically stacked for delivery to the purchaser/user (e.g., a packing plant). Manual vertical stacking of containers or objects can result in errors (e.g., damage to the container and/or objects during the stacking process) and/or injuries to persons performing the stacking operation. Additionally, when using conventional mechanical and/or automated stacking apparatuses and/or equipment, the free-moving flaps or panels of such containers or objects can create an obstruction if the flaps or panels move in the wrong direction as the containers or objects are stacked together, thereby preventing an efficient use of the apparatuses and/or equipment.

Therefore, the need exists for apparatuses and/or equipment that can stably, vertically stack objects (e.g., containers, Bliss-type trays and/or boxes) that have foldably-attached, free-moving parts, flaps and/or panels, so that the parts, flaps or panels do not obstruct or interfere with the process of stacking the objects. Likewise, there is a need for a method of efficiently stacking objects having foldably-attached, free-moving parts that provides a stable stack of such objects, and for a method of manufacturing such apparatuses and/or equipment.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY OF THE INVENTION

The present invention relates to apparatuses and/or equipment capable of stably stacking objects, containers and/or boxes having foldably-attached and/or free-moving parts, flaps or panels attached thereto in a manner that avoids obstruction of the stacking process by the parts, flaps or panels. The present invention also relates to methods of stacking objects, containers and/or boxes using the stacking apparatuses and/or equipment, and methods of manufacturing such stacking apparatuses and/or equipment.

The present invention advantageously provides a mechanical apparatus and/or mechanical equipment that is capable of stably stacking objects (e.g., containers such as Bliss-type boxes or trays) having foldably-attached and/or free-moving parts, flaps and/or panels, thereby avoiding (1) injuries to workers or handlers that can result from manually stacking the containers, (2) damage to the containers and/or objects being stacked, and (3) obstructions or instability in the vertical stack of objects that may result from inadvertent folding of the parts, flaps and/or panels in the wrong direction during the stacking process. To facilitate vertical stacking, the objects may be designed so that they can be stacked in a nested arrangement, where an object vertically overlaps with another object directly adjacent to the object in a stack. Such objects can be placed in a stacked, nested arrangement with the foldably-attached parts, flaps and/or panels being directed to the exterior of the stack. The present stacking apparatuses and/or equipment, methods for stacking overlapping and/or interlocking objects, and methods of manufacturing such stacking apparatuses and/or equipment provide a system for efficient, safe, and stable vertical stacking of objects having foldably-attached and/or free-moving parts, flaps and/or panels, thereby facilitating the transportation of the manufactured objects to a customer (e.g., a packing house) at low cost.

These and other advantages of the present invention will become readily apparent from the detailed description of preferred embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Embodiments of the present invention relate to stacking apparatuses and/or equipment that can stably and vertically stack objects (e.g., containers such as Bliss-type boxes, trays, etc.) having free-moving and/or foldably-attached parts, flaps and/or panels, in a manner that avoids jams or complications due to irregular folding and/or obstruction of the stacking process by the parts, flaps or panels, methods of stacking containers using the stacking apparatuses and/or equipment, and methods of manufacturing apparatuses and/or equipment for stacking objects.

The objects that may be vertically stacked by the present apparatuses are generally designed so that they can be stacked in a nested arrangement, where an object vertically overlaps with another object directly adjacent to (e.g., above) the object in the stack. For example, the present stacking apparatuses may be used to stack stackable Bliss-type trays or boxes and other stackable containers made from corrugated paper (like those shown in FIG. 1). In other embodiments, the stackable objects may be made from a plastic, a laminate (e.g., paperboard or corrugated paper laminated with plastic and/or foil), combinations thereof, etc. While the figures of the present application show a Bliss-type tray, the invention is not limited to use with Bliss-type containers, and may be applicable to any stackable object, with free-moving and/or foldably-attached parts, flaps and/or panels, particularly where the foldably-attached parts are at or near a top or uppermost part of the object (e.g., non-Bliss-type containers, toys, sporting equipment, foldable displays, etc.).

Figure 1:
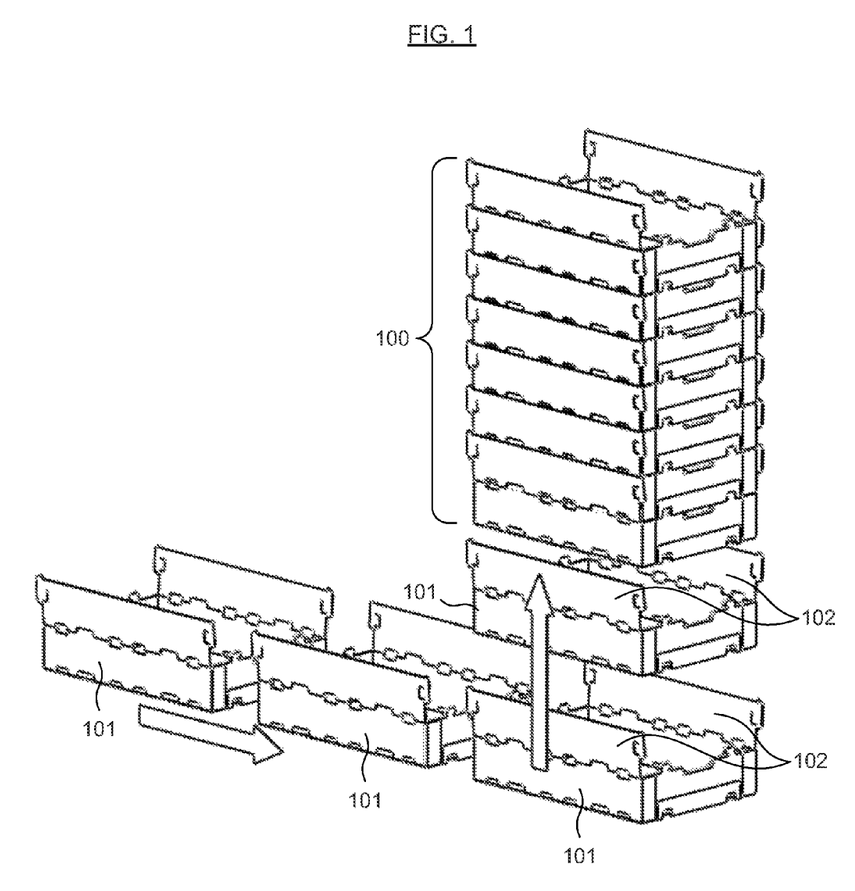
FIG. 1 is perspective view of an exemplary path for stacking objects (e.g., containers, boxes, trays, etc.).

FIG. 1 shows an exemplary path for stacking an object (e.g., a container, a Bliss-type box or a tray). Containers 101 to be stacked are moved one at a time under a container stack 100. The containers 101 may be moved manually or automatically (e.g., by a conveyor, feed wheels, a robotic arm or another automatic indexing system; not shown). Each container 101 having flaps 102 is positioned under the stack of containers 100 and then moved substantially vertically upward into the stack 100 by operation of the stacking apparatuses and/or equipment of the present invention. During the stacking process, the flaps 102 are moved out and/or away from the container stack 100, thereby significantly reducing or eliminating jams and/or damage to the containers which may be caused by irregular folding of the flaps 102 and/or obstruction of the stacking process by such flaps 102.

Exemplary Stacking Apparatuses

Figure 2:
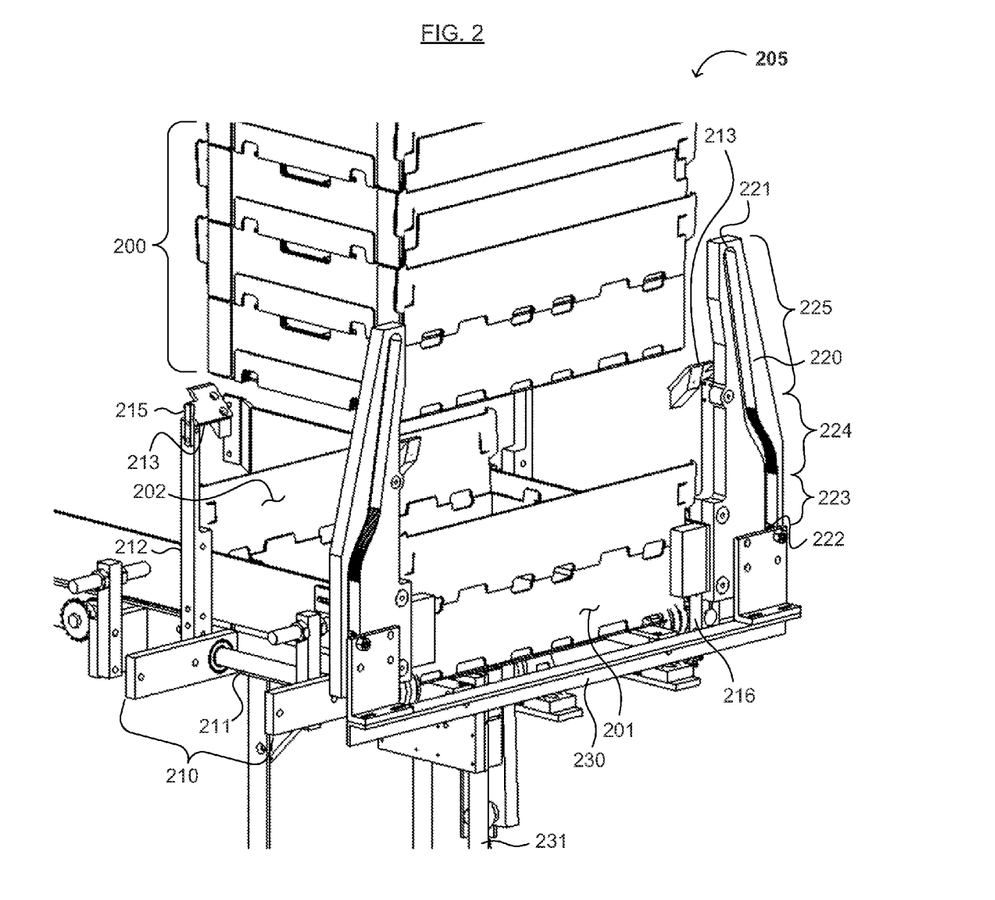
FIG. 2 is a perspective view of an exemplary stacking apparatus showing a flap guide assembly, cams, a lift assembly and a single container in the stacking apparatus prior to being stacked into the stack of containers.
Figure 3:
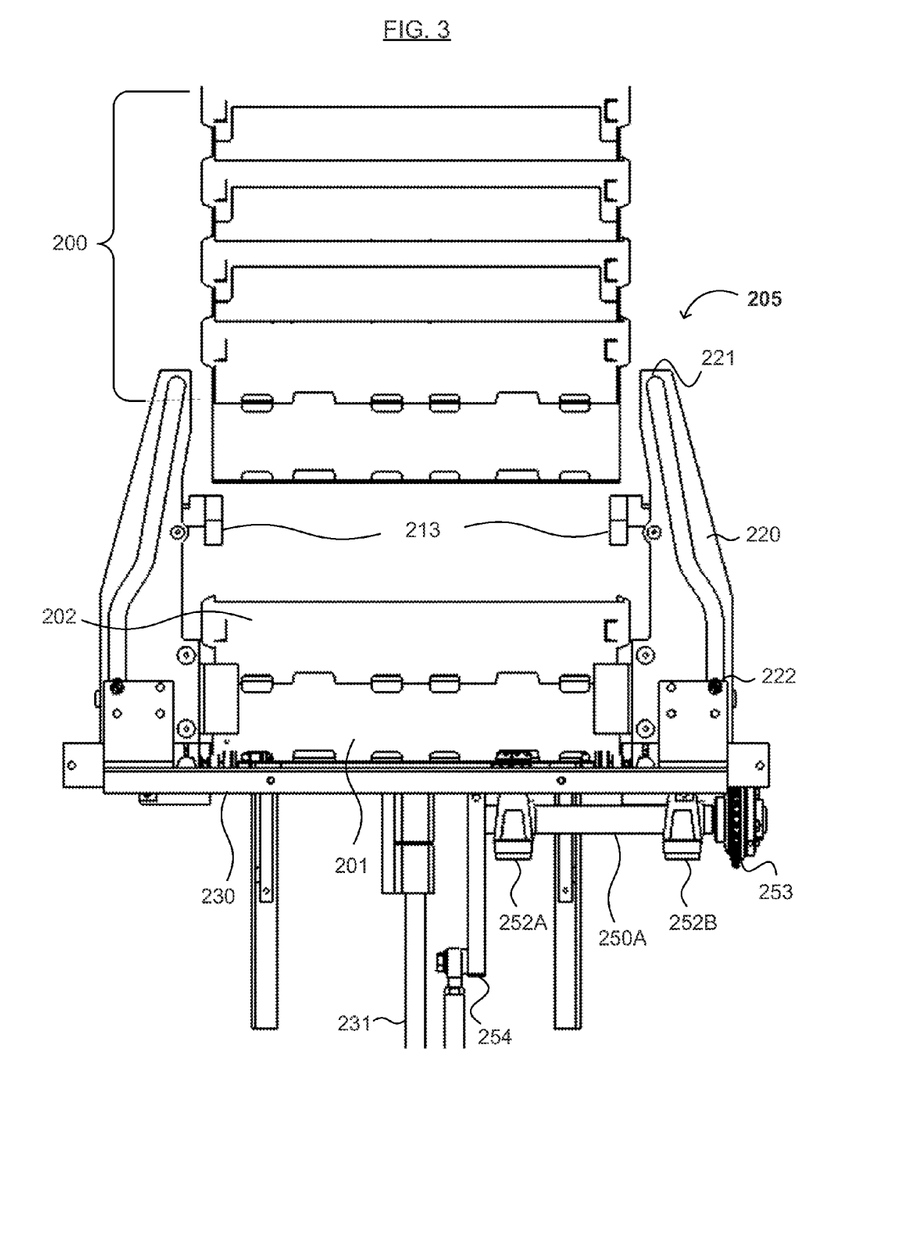
FIG. 3 is a side view of an the stacking apparatus of FIG. 2, showing the cams, the cam tracks, the cam followers and the flap guides positioned to move a flap of a container that has entered the stacking apparatus out and away from the stack of containers prior to being stacked.

Referring now to FIGS. 2-3, an embodiment of the present stacking apparatuses 205 includes a lift assembly 230 into which a container 201 may be delivered. While FIGS. 2-3 show a Bliss-type box or tray, the stacking apparatuses and/or equipment of the present invention is not limited to stacking Bliss-type boxes or trays, and instead, may be used to stack other container types (e.g., regular slotted cases, center special-slotted containers, one-piece tray form boxes with top flaps, etc.) and any other object having foldably-attached and/or free-moving parts, flaps and/or panels in which the bottom surface has smaller width and length dimensions than the top. In the container industry, this may be accomplished by changing the angle of the sidewalls from 90° to slightly more than 90° (e.g., from 91° to 95°) relative to the bottom surface of the container. As shown in FIGS. 2-3, the lift assembly 230 comprises a lifting mechanism 231, which is configured to move the lift assembly 230 substantially vertically during the stacking process and stack the container 201 into the nested container stack 200. The stacking apparatus shown in FIGS. 2-3 adds the container 201 in the lift assembly 230 to a vertical stack of containers 200 located above the lift assembly 230. The process creates a vertical stack 200 of nested containers 201, and does so by adding containers 201, one at a time, to the bottom of the stack 200.

Figure 8:
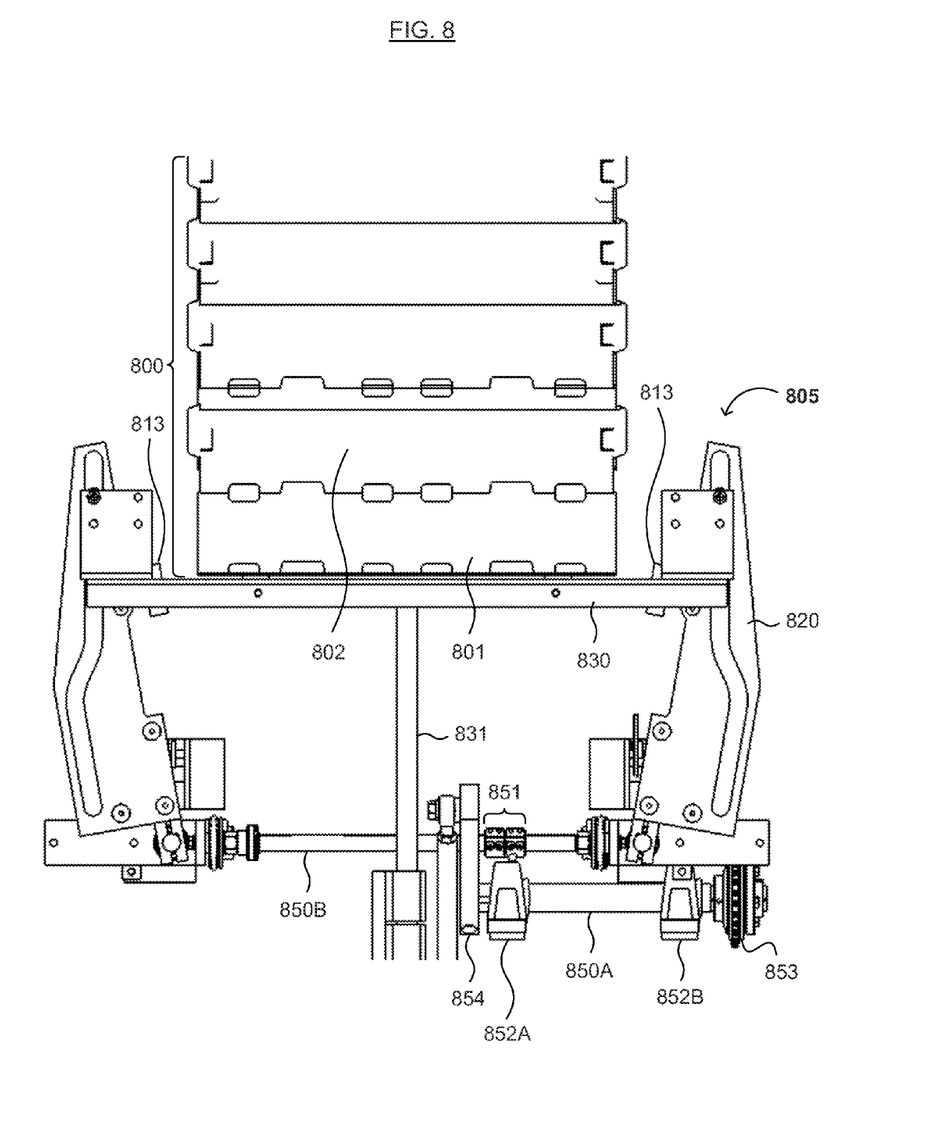
FIG. 8 is a side view of an exemplary stacking apparatus showing the disengagement of the flap guides from the flaps of a container by rotation or movement of the cams and the flap guides out and/or away from the container.

In some embodiments, the container 201 may be transferred into the lift assembly 230 automatically (e.g., by a conveyor, feed wheels, a robotic arm and/or another automatic delivery system, each of which may include, but not be limited to, one or more shafts [see e.g., 250A in FIG. 3 and 850A and 850B in FIG. 8], couplings [see e.g., 851 in FIG. 8], bearings [see e.g., 252A and 252B in FIG. 3 and 852A and 852B in FIG. 8], one or more sprockets [see 253 in FIG. 3 and 853 in FIG. 8], crank arms [see e.g., 254 in FIG. 3 and 854 in FIG. 8] and/or other drive and/or auxiliary drive components which, in combination, are capable of moving the container 201 into the lift assembly). In alternative embodiments, the container 201 may be delivered into the lift assembly 230 manually. In some embodiments, the lifting mechanism 231 may comprise a central extendable support structure (e.g., one or more cylindrical metal rods [as shown], one or more pistons with a round, a square, a rectangular or another cross-sectional shape, one or more metal pipes, tubes, angles, channels and/or other shapes of formed, rolled and/or cast metal "legs," one or more telescoping rods, etc.), one or more drive mechanisms (e.g., one or more pneumatic cylinders, hydraulic cylinders, motors, servo motors and/or other mechanisms capable of moving the lift assembly 231 toward the container stack 200; not shown), and a framework adapted to attach the central support structure to the drive mechanism(s) and to other components of the stacking apparatus 205. In some embodiments, the framework may comprise plates, angles, channels and/or other structural metal components capable of supporting the container 201 and other components of the stacking apparatus 205.

In some embodiments, materials such as plastic, Plexiglas®, fiberglass and/or composite materials may be used for the framework and/or the central support structure in lieu of or in addition to one or more metals. In some embodiments, the framework may also include linear, ball and/or other types of bearings configured to allow the framework to move in relationship to the drive mechanism and/or central support structure. In still other embodiments, the framework and/or the central support structure may further comprise one or more rack and pinion gearing systems, belt and pulley systems, and/or other auxiliary drive components configured to facilitated movement of the framework relative to the central support structure and/or other components of the stacking apparatus. In some embodiments, the lift assembly and lifting mechanism 231 may be driven upwards toward the stack 200, and then return to an initial position by the force of gravity. In other embodiments, the lifting mechanism 231 may be driven both upward toward the stack 200 and then back to the initial position.

In the exemplary stacking apparatus 205 of FIG. 2, there are four flap guides 213 in the stacking apparatus 205. Each of the flap guides 213 is attached to an arm 212 and positioned at and/or or near each of two opposing ends of the container 201. One of the flap guides 213 is positioned over each end of the two container flaps 202. In the embodiment of FIGS. 2-3, the flap guides 213 are flat plates. In embodiments wherein the flap guides are flat plates, the flap guides may be initially positioned at an angle of between 1° to 89° (e.g., 10° to 80°, 20° to 60°, 25°, 38°, or any value or range of values therein) relative to the vertical plane of the container flaps 202. Alternatively, the flap guides 213 may have an irregular shape, such as a curved profile or a profile having multiple angles therein.

Each of the flap guides 213 is attached to a first end 215 of one of the four arms 212. In the embodiment shown in FIGS. 2-3, the second end 216 of each arm 212 is attached and fixed to one of two rotatable shafts 211 located at opposite ends of the lift assembly 230. Thus, the flap guides 213 and the arms 212 to which they are attached are arranged in pairs that rotate together and with one of the rotatable shafts 211. In alternative embodiments, the second end 216 of each arm 212 may be hingedly attached to a mounting bracket and configured to allow the arm to move toward and/or away from the container flaps 202. In other embodiments, the second end 216 of each arm 212 may be pivotally attached to a fixed shaft and the arms 212 may rotate around the shaft. In still other embodiments, the second end 216 of each arm 212 may be attached to a sliding mechanism (e.g., a linear bearing on a shaft, a roller in a track, a rail and carriage, etc.) that allows the arms to move away from and back towards the container.

Figure 5:
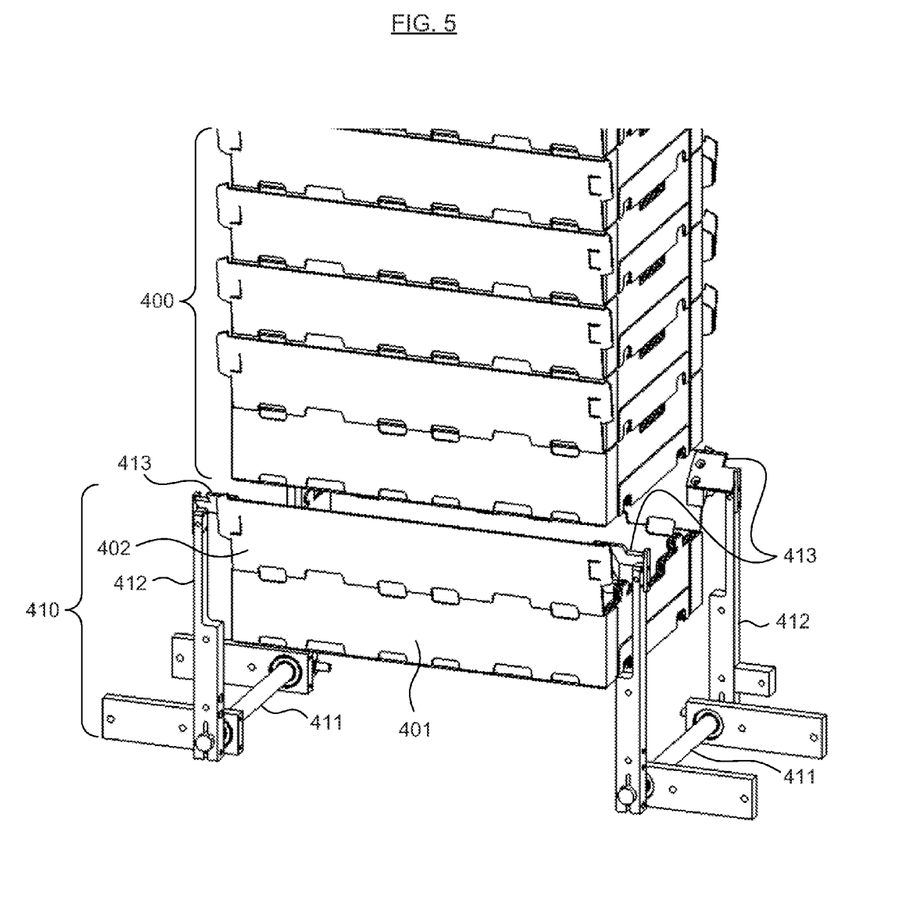
FIG. 5 is a perspective view of the exemplary stacking apparatus of FIG. 4, showing engagement of the flap guides with the flaps of a container as the container is moved into a stack of containers (shown without the cams for clarity).
Figure 6:
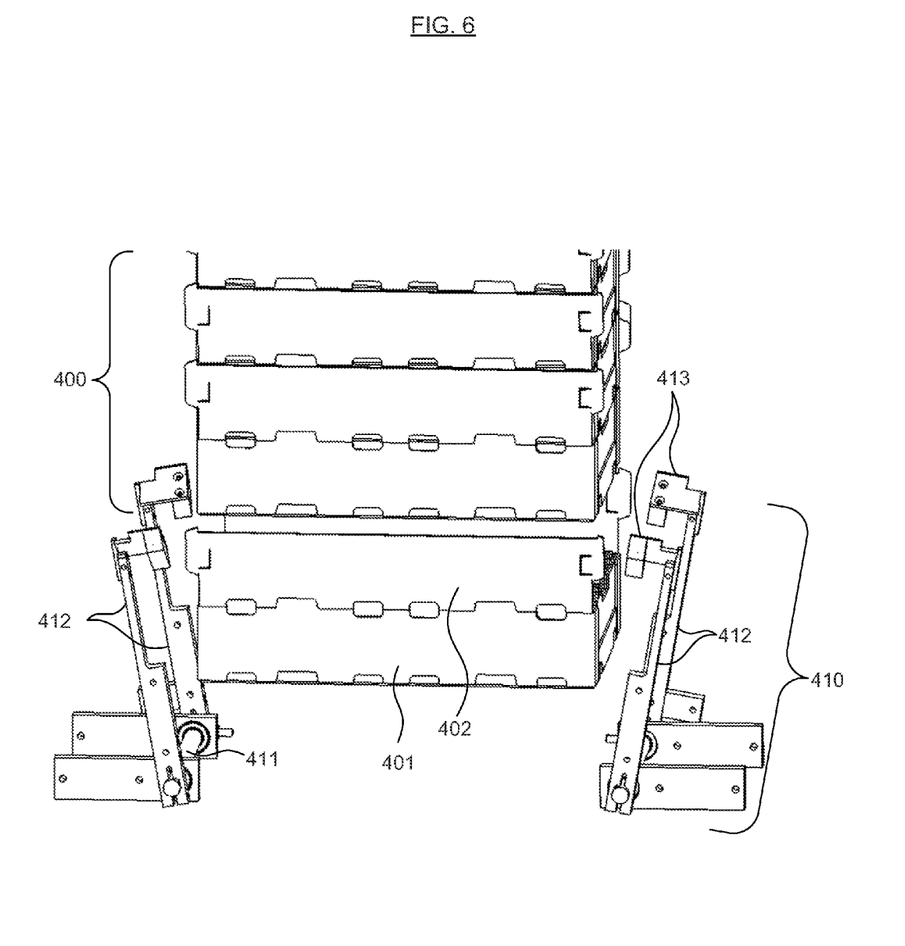
FIG. 6 is a perspective view of the exemplary stacking apparatus of FIG. 4, showing disengagement of the flap guides from the flaps of a container by movement of the flap guides and arms out and/or away from the container (shown without the cams for clarity).

The combination of a rotatable shaft 211 (or other mechanism that allows for movement of the arms 212 and the flap guides 213 as described above), are referred to as flap guide assemblies 210 (see also, FIGS. 5 and 6, wherein the flap guide assemblies 410 comprise rotatable shafts 411, arms 412, and flap guides 413). In the embodiment shown in FIGS. 2-3, there are two flap guide assemblies 210 in the stacking apparatus 205, and these flap guide assemblies 210 are located at opposite ends of the lift assembly 230 along the length of flap 202. In alternative embodiments, the flap guide assemblies 210 may comprise a single arm 212 and a single flap guide 213. Where there are two flaps 202 on container 201 and a single arm 212 on each flap guide assembly 210, the arm 212 on each assembly 210 is located on opposite sides of container 201, so that there is one flap guide 213 for each flap 202. When there is a single flap 202 on container 201, the arm 212 on each flap guide assembly 210 may be located on the same side of container 201.

The stacking apparatus shown in FIGS. 2 and 3 also includes two cams 220. Each cam 220 is attached to one of the flap guide assemblies 210. Each of the cams 220 (with one of the flap guide assemblies 210 attached thereto) is located at one end of the lift assembly 230, such that when a container 201 is delivered into the lift assembly 230, there is a cam 220 and a flap guide 213 at each end of the container 201, and a flap guide 213 is over each end of each flap or panel 202 of the container. However, in alternate embodiments, there may be two cams 220 attached to each flap guide assembly 210 at opposite sides and, thus, two cams 220 located at each end of lift assembly 230 on opposite sides of container 201. In still other embodiments, there may be a single cam 220 for both flap guide assemblies 210 and one or more arms 212 of each flap guide assembly 210 may be linked with a corresponding arm 212 on the other flap guide assembly 213 (e.g., by a cross-brace, a slat, a rod, or another structure physically joining the two arms together), so that the arm(s) 212 moves together with the corresponding arm(s) 212. Each cam 220 attached to an arm 212 has a cam track 221 (e.g., a slot) formed therein. In alternative embodiments, the cam track 221 may be formed in and/or be a part of the corresponding arm 212.

In the embodiment shown in FIGS. 2 and 3, each of the cam tracks has a first section 223, a second section 224 and a third section 225 along the length of the cam 220 (see, FIG. 2). The lift assembly 230 is attached, affixed or secured to rotatable cam followers 222 (e.g., rollers) that are nested in the cam tracks 221, but that have no fixed attachment to the cams 220 or the cam tracks 221. The cam followers 222 are designed to move within the cam tracks 221 as the lift assembly 230 moves to stack the container 201 positioned in the lift assembly 230. Because each of the cams 220 is attached to and/or part of one of the flap guide assemblies 210, the movement of the cam followers 222 through the cam tracks 221 controls the movement of the associated flap guide assemblies 210 (see, e.g., FIGS. 2 and 8). The height of the first section 223, second section 224 and/or third section 225 of the cam track 221 may correspond to and/or be derived from one or more dimensions of the container 201.

Figure 4:
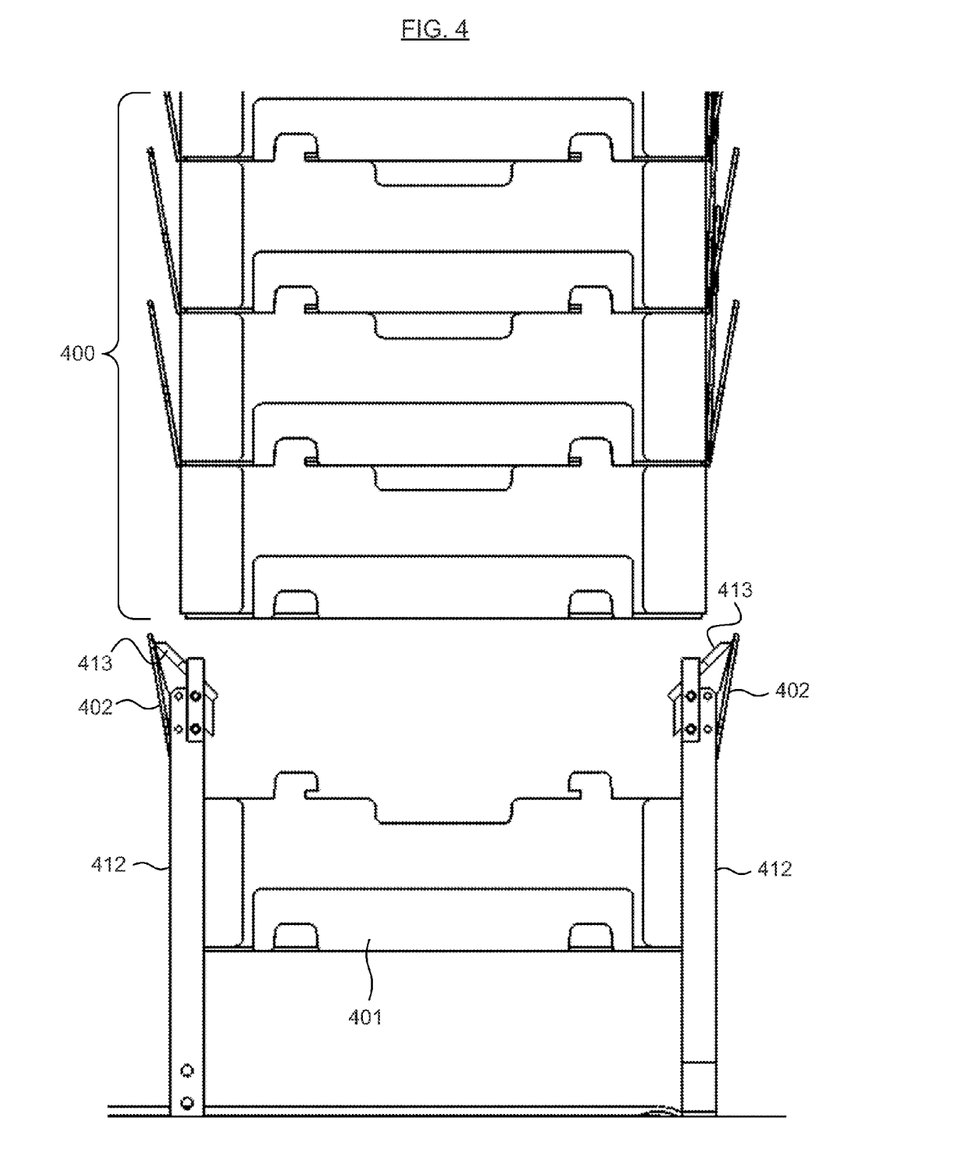
FIG. 4 is an end view of an exemplary stacking apparatus demonstrating the position of the flap guides in relation to the container flaps, and the direction of travel of the lift assembly to move a container into a stack of containers.

In FIG. 4, a container 401 to be added to a container stack 400 is shown with the flap guides 413 of the stacking apparatus engaged with the flaps 402 of the container 401. As the container 401 travels upward, the flap guides 413 plow, push and/or otherwise move the flaps 402 of the container 401 away from the container stack 400 so that the flaps 402 do not obstruct and/or interfere with the stacking process. Although the flap guides 413 are shown to be flat plates set at an angle, in other embodiments, the flap guides may have a curved, multi-angled and/or another irregular shape.

Referring now to FIGS. 4-5, the arms 412 are positioned vertically or substantially vertically when the flaps 402 of container 401 are engaged with the flap guides 413. However, in alternative embodiments, the arms 412 may be at an angle towards and/or away from the container stack 400 when the flap guides 413 are engaged with the flaps 402.

Figure 7:
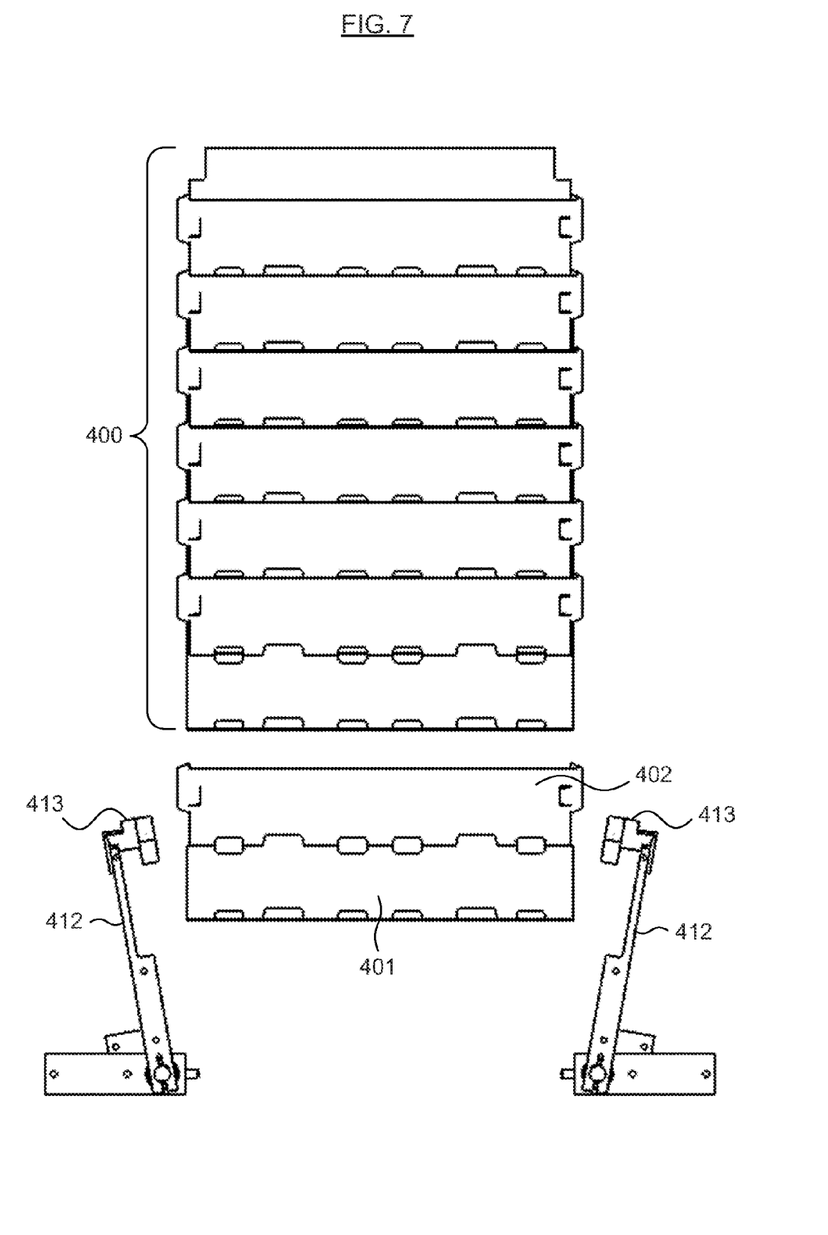
FIG. 7 is a side view of the exemplary stacking apparatus of FIG. 4, showing disengagement of the flap guides from the flap of the container by movement of the flap guides and arms out and/or away from the container (shown without the cams for clarity).

In FIGS. 6-7, the flap guides 413 and arms 412 are moved (by movement of the cams 820 as shown in FIG. 8) out and/or away from the container stack 400, and the flap guides 413 are disengaged from the container flaps 402 before the flaps 402 overlap the bottom container of the container stack 400. However, in alternative embodiments, the flap guides 413 may remain engaged with container flaps 402 until the flaps 402 overlap the bottom container of the container stack 400, but disengage before the sidewalls of container 401 contact the flap guides 413 and before container 401 is added to container stack 400.

FIG. 8 shows an exemplary stacking apparatus 805 as a container 801 is added to the container stack 800. When container 801 is nested in the container stack, lift assembly 830 and lifting mechanism 831 are at their furthest point of vertical travel, and the container flap 802 overlaps the adjacent container in the stack 800. In the embodiment shown in FIG. 8, the flap guides 813 are disengaged from the container flap 802 and the cams 820 are rotated out and/or away as container 801 is added to the container stack 800. In alternative embodiments, the cams 820 may be rotated toward the container stack 800 and the flap guides 813 may remain engaged with the flap 802 until after the container 801 is added to the stack 800.

In FIGS. 2-8, the container stack 200, 400 or 800 may be supported from above, below and/or one or more sides by one or more stack supports (not shown in the figures) comprising metal plates, angles, channels and/or other metal components capable of supporting the container stack 200, 400 or 800. Alternatively the stack support(s) may comprise plastic(s), Plexiglas®, fiberglass and/or composite material(s) capable of supporting the stack 200, 400 or 800 in lieu of or in addition to one or more metals. In some embodiments, the stack support(s) may comprise one or more hinged and/or pivotally attached components configured so that as the container 201, 401 or 801 travels toward the stack 200, 400 or 800, the flaps 202, 402 or 802 contact the hinged and/or pivotally attached component(s) and cause the hinged and/or pivotally attached component(s) and/or support(s) to be moved and/or rotated out of the way, so that the container 201, 401 or 801 may be added to the bottom of the stack 200, 400 or 800. After the container 201, 401 or 801 is added to the stack 200, 400 or 800, the hinged and/or pivotally attached component(s) may then be automatically returned by gravity, force from one or more springs and/or the weight distribution of the components to an initial position supporting the container stack 200, 400 or 800.

In FIGS. 2-8, the stacking apparatuses are used to stack Bliss-type boxes or trays which may be made from corrugated paper. However, the present stacking apparatuses may be used to stack other types of objects or containers having one or more foldably-attached parts, flaps and or panels, and/or objects or containers made from other materials such as corrugated paper, plastic and/or a laminate (e.g. paperboard or corrugated paper laminated with plastic and/or foil).

Exemplary Methods of Stacking Objects

Other embodiments of the present invention relate to methods of stacking objects with foldably-attached parts, flaps and/or panels such as containers, Bliss-types boxes, trays, etc. The stacking process generally includes moving a lift assembly substantially vertically upward, toward one or more flap guides. The vertical movement of the lift assembly causes one or more cam followers to move through corresponding cam track(s). One or more slopes of the cam track(s) causes the flap guide(s) to move with respect to the foldably-attached parts, flaps and/or panels of the object being stacked. In some embodiments, the method may further comprise moving the cam follower(s) through a first section, a second section and a third section of the cam track.

Figure 9:
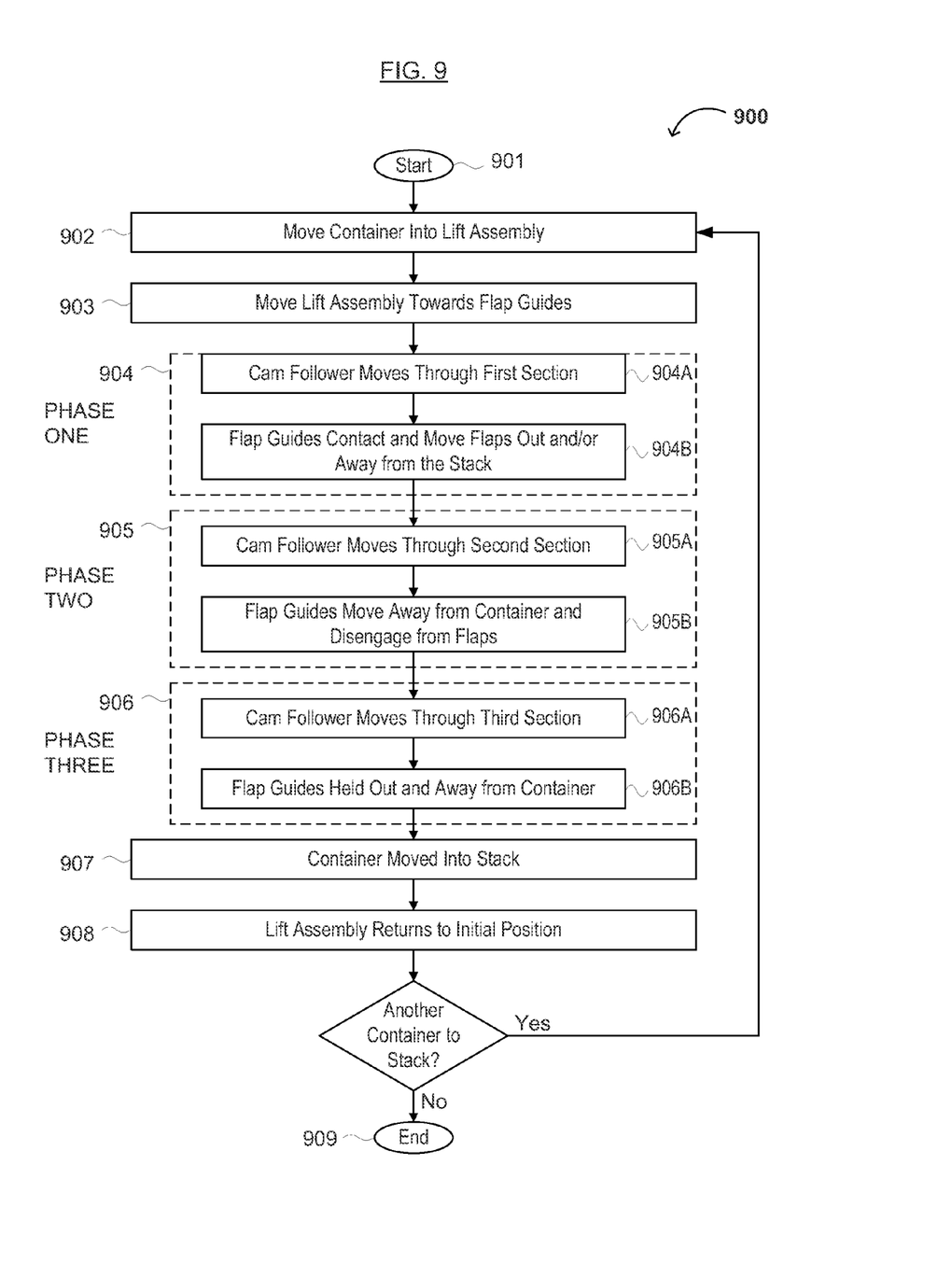
FIG. 9 is a flow diagram showing an exemplary method of stacking a container in accordance with an embodiment of the present invention.

FIG. 9 shows a flow chart 900 for an exemplary method of stacking containers using an embodiment of a stacking apparatus of the present invention (such as the stacking apparatus 205 of FIGS. 2-3). While the stacking method is described in relation to the stacking of containers, the method is equally applicable to stacking any object with a foldably-attached part, flap and/or panel and/or any object that can be stacked in a nested manner. The method begins at 901. At 902, a container to be stacked (such as container 201 in FIGS. 2-3) is moved into a lift assembly (such as the lift assembly 230 of FIGS. 2-3). At 903, the lift assembly moves upward by the action of a lifting mechanism (such as the lifting mechanism 231 of FIGS. 2-3). In the embodiment of FIG. 9, the movement of lift assembly is divided into three phases 904-906. The three phases 904-906 of stacking process are associated with the movement of cam followers (such as the cam followers 222 of FIGS. 2-3) in sequence through three sections (such as sections 223-225 of FIGS. 2-3) of the cam track (such as cam track 221 in FIGS. 2-3).

At 904, the first phase of the method is performed. At 904A, cam followers move through a first section (such as the first section 223 of FIGS. 2-3) of the cam track. At 904B, generally while the cam followers are moving through the first section of the track, the flap guides (such as the flap guides 213 in FIGS. 2-3) contact the foldably-attached parts, flaps and/or panels (such as flaps 202 in FIGS. 2-3) and move the parts, flaps and/or panels out and/or away from a container stack (such as the container stack 200 of FIGS. 2-3). In some embodiments, the slope of the first section may be vertical or substantially vertical (see, e.g., FIG. 2). In these embodiments, as the cam followers move vertically through the first slope of the cams, the cams and flap guide assemblies maintain a vertical or substantially vertical orientation. During the first phase 904, the flap guides are situated over the vertically oriented flaps of the container, and thus catch the flaps as they move vertically with the lift assembly, thereby plowing, pushing and/or otherwise moving the flaps out and/or away from the container stack above so that the container can be stacked without the flaps folding under and/or catching the vertical stack of containers (see, e.g., FIGS. 4-5). Thus, the flaps of the container become engaged with the flap guides during the first phase of the stacking process. The cam followers may continue to move vertically through the first section of the cam tracks after the flap guides catch the lid flaps of the container.

In some embodiments, the first section of the cam track is designed to be long enough to allow the flaps of the container to engage with the flap guides and stay engaged until the flaps overlap with the bottom container of the container stack. Thus, when released or disengaged by the flap guides, the flaps will not fold or catch under the container stack into which the next container is being stacked (see, e.g., FIG. 5). Thus, this embodiment ensures that the stacking process will not be obstructed the by the foldably-attached parts, flaps and/or panels of the object or container.

At 905, the second phase of the exemplary method of stacking is performed. At 905A, the cam followers move through a second section of the cam track (such as the second section 224 in FIGS. 2-3). At 905B, generally while the cam followers are moving through the second section of the track, the flap guides move out and/or away from the container being stacked and disengage from the foldably-attached part, flap and/or panel. The angle of the cam track in the second section may vary, and may be oriented anywhere from 1° to 45° (e.g., 10° to 30°, 15° to 25°, or any other range of values therein) toward the container being stacked relative to the angle of the cam track in the first section. As the cam follower moves through the second section, the cams and flap guide assemblies are pushed outward by the moving cam followers, away from the container and the lift assembly (see, e.g., FIGS. 6-8). The flap guides generally disengage from the flaps before the sidewall of the container reaches the flap guides.

In some embodiments, the cams and the flap guide assemblies are able to rotate outward as they are pushed by the cam followers because the cams and arms (such as the arms 212 in FIGS. 2-3) with attached flap guides are fixedly attached to rotatable shafts (see, e.g., shaft 211 in FIG. 2 and shaft 411 in FIG. 5). In other embodiments, the cams and arms with flap guides may be hingedly connected to a support arm and/or mounting bracket. In such embodiments there may be a cam attached to and/or formed in each arm, or the arm with the attached cam (or the cam formed therein) may be mechanically linked to the arm with no such cam. In still other embodiments, the cams and arms with flap guides may comprise bearings mounted to a fixed shaft so that the arms can slide or otherwise move away from the stack and the container. In embodiments with a fixed shaft, the cams and arms may rotate while the shaft remains fixed.

At 906, the third phase of the stacking method is performed. At 906A, the cam followers move through a third section of the cam track (such as the third section 225 in FIGS. 2-3). At 906B, the flap guides are held out and/or away from the container to be stacked. During the third phase 906, the cam followers may move vertically through the third section of the cam track, which maintains the cams and the flap guide assemblies at a position out and/or away from the container to be stacked as stacking is completed. Alternatively, the cam track in the third section may have a slope of from 0° to 45° (e.g., 5° to 30°, 10° to 25°, or any other range of values therein) away from the container relative to the cam track in the second section. In some embodiments, the slope of the third section may be simply a continuation of the slope of the second section (i.e., the slope of the third section may be 0° relative to the slope of the second section at a point where the second and third sections meet), or it may be angled away from the container and lift assembly relative to the cam track in the second section (e.g., the slope may be 1 to 45° relative to the slope of the second section). In embodiments in which the third section angles away from the container and lift assembly, the vertical movement of the cam followers through the third section may cause the cams and the flap guides to move toward the container and lift assembly. However, no embodiment includes an arrangement in which the angle of the cam track in the third section causes the flap guides to be pushed into the sides of the container being stacked.

At 907, the container is lifted into a nested and stacked position in which the flaps of the container are located to the outside of and overlapping with the container immediately above it in the stack (see, e.g., FIG. 8). At 908, the lift assembly returns to an initial position (e.g., by action of the lifting mechanism 231 of FIGS. 2-3 and/or by gravity). As the lift assembly is lowered, the cam followers move sequentially back through the cam tracks in the third, second and first sections, thereby returning the cams and the flap guides to their original positions. Another container may then be delivered into the lift assembly to be stacked into the container stack, and the method repeated.

In some embodiments, the method may further comprise indexing the stack of containers upward a distance that is substantially equal to the depth of the next container to be stacked. In other embodiments, the stack may be indexed a distance greater than the depth of the next container to be stacked. In some embodiments, the method may further comprise adjusting the angle of the flap guides with respect to one or more flaps of the container to be stacked prior to beginning and/or repeating the stacking process. In yet further embodiments, the next container to be stacked may be moved automatically into the lift assembly by a conveyor, feed wheels, a robotic arm and/or other automatic indexing system.

Exemplary Methods of Manufacturing—Stacking Apparatuses

Still other embodiments of the present invention relate to methods of manufacturing apparatuses and/or equipment for stacking objects (e.g., containers, Bliss-type boxes, trays, or other objects having foldably-attached parts, flaps and/or panels) generally comprising (1) assembling at least two flap guide assemblies by attaching a flap guide to a first end of each of one or more arms, wherein the flap guide is configured to contact a foldably-attached part of a next object and move the part out and/or away from a stack of substantially identical objects, (2) attaching a second end of each of the one or more arms to one or more mounting brackets, and (3) constructing a cam by forming a cam track in and/or attaching a cam track to at least one of the arms of each of the flap guide assemblies, and placing a cam follower in each of the cam tracks, wherein the cam follower is configured to move along one or more sections of the cam track so as to move the one or more arms and corresponding flap guides with respect to a stack of objects, and (4) connecting a lift assembly having a lifting mechanism to the cam followers, wherein the lift assembly is configured to move a next object into the stack of objects.

In some embodiments of the present invention, the mounting bracket(s) may comprise a rotatable shaft, and the second end of each of the arms may be fixedly attached to the rotatable shaft. In other embodiments, the shaft may be fixed, and the second end of each arm may be pivotally attached to the shaft. In yet other embodiments, the mounting bracket may comprise a hinge, wherein the hinge is configured to allow the one or more arms to move toward and/or away from the foldably-attached parts, flaps and/or panels of the next object to be stacked. In such embodiments, the method may further comprise mechanically linking an arm having an attached cam (or a cam formed therein) with a corresponding arm without a cam.

In some embodiments, the flap guides may be pivotally attached to an arm so as to allow adjustment of the angle of the flap guide with respect to the foldably-attached part. In other embodiments, the flap guides may be multi-angled, curved or have another irregular shape. In some embodiments, the cam follower may comprise a roller that rotates within the cam track as the cam and attached lift assembly move toward the stack of objects. In other embodiments, the cam follower may comprise a needle bearing. In some embodiments, the cam track may be formed in the corresponding arm. In other embodiments, the cam track may be formed in a separate piece or plate attached to the corresponding arm.

In some embodiments, the lift assembly may comprise a central support structure and the method may further comprise attaching one or more cylindrical metal rods, one or more pistons with a round, a square or another cross-sectional shape, one or more metal pipes, tubes, angles, channels and/or other shapes of formed, rolled or cast metal legs, and/or one or more telescoping rods to the lift assembly. In some embodiments, the lift assembly may comprise one or more drive mechanisms, and the method may further comprise attaching one or more pneumatic cylinders, hydraulic cylinders, motors and/or servo motors to the central support structure and/or other components of the lift assembly. In further embodiments, the lift assembly may comprise a framework adapted to attach the central support structure to the drive mechanism and/or other components of the stacking apparatus and the method may further comprise attaching metal plates, angles, channels and/or other structural metal components capable of supporting the components of the stacking apparatus to the central support structure and/or the drive mechanisms. In some embodiments, materials such as plastic, Plexiglas®, fiberglass and/or composite materials may be used for the framework and/or central support structure in lieu of or in addition to one or more metals. In still further embodiments, the method may further comprise attaching one or more rack and pinion gearing systems, belt and pulley systems and/or other auxiliary drive components to the framework, configured to facilitate the movement of the framework relative to the central support structure and/or other components of the stacking apparatus.

CONCLUSION/SUMMARY

Thus, the present invention provides stacking apparatuses and/or equipment that allows for stable vertical stacking of objects (e.g., containers, Bliss-types boxes, trays, etc.) having foldably-attached and/or free-moving parts, flaps and/or panels without the need for manual handling of the objects, methods of vertically stacking objects using the stacking apparatuses, and methods of manufacturing apparatuses and/or equipment to stack objects such as containers, Bliss-type boxes, trays and other objects having foldably-attached parts, flaps and/or panels.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus, comprising:
   a) at least two flap guide assemblies, each flap guide assembly comprising:
      i) one or more arms; and
      ii) one or more flap guides, each of the one or more flap guides attached to a first end of one of the arms and configured to contact and move a foldably-attached part of an object out and/or away from a stack of substantially identical objects;
   b) one or more cams, each cam comprising:
      i) a cam track in and/or on one of the arms of the at least two flap guide assemblies, the cam track having one or more sections, wherein the cam track comprises a first section having a first slope, a second section having a second slope that is different from the first slope, and a third section having a third slope that is different from the second slope; and
      ii) a cam follower configured to move in the cam track along the one or more sections and move the one or more arms with respect to the stack; and
   c) a lift assembly having a lifting mechanism, the lift assembly connected to each of the one or more cams at the corresponding cam follower, the lift assembly configured to move the object having foldably-attached parts vertically upward and facilitate upstacking the object into the stack of objects.

2. The apparatus of claim 1, wherein each of the flap guide assemblies further comprises a rotatable shaft, and a second end of each of the one or more arms is fixedly attached to and/or configured to move with the rotatable shaft.

3. The apparatus of claim 1, wherein the object comprises a container, and the foldably-attached part comprises a container flap.

4. The apparatus of claim 1, wherein each of the one or more flap guides comprises a plate positioned at an angle of from 1° to 89° relative to the foldably-attached part of the object.

5. The apparatus of claim 4, wherein an inner surface of the plate is flat when viewed in profile.

6. The apparatus of claim 1, wherein the lifting mechanism comprises one or more hydraulic cylinders, pneumatic cylinders and/or motors.

7. The apparatus of claim 1, wherein one of the cams and one of the flap guide assemblies are positioned at and/or near each of two opposing ends of the object, and one of the flap guides in each flap guide assembly is positioned over an end of the foldably-attached part of the object.

8. The apparatus of claim 1, wherein the first slope is substantially vertical and the second slope is at an angle of from 1° to 45° toward the next object with respect to the first slope.

9. The apparatus of claim 8, wherein the third slope is at an angle of from 1° to 45° toward the next object with respect to the angle of the second slope and at an angle of less than 90° with respect to the lift assembly.

10. A method of stacking objects, comprising:
    a) moving a next object having foldably-attached parts into a lift assembly;
    b) moving the lift assembly toward one or more flap guides in a flap guide assembly;
    c) moving one or more cam followers through a first section of a cam track having a first slope, the first section configured to move the one or more flap guides such that the one or more flap guides contact and move the one or more foldably-attached parts on the next object out and/or away from a stack of such objects;
    d) moving the one or more cam followers through a second section of the cam track having a second slope that is different from the first slope, the second section configured to move the one or more flap guides outward and/or away from the next object and the lift assembly such that the one or more flap guides disengage from the foldably-attached parts;
    e) moving the one or more cam followers through a third section of the cam track having a third slope that different from the second slope, the third section configured to hold the one or more foldably-attached parts out and/or away from the next object and the lift assembly;
    f) moving the next object vertically upward to upstack the next object into a stack of substantially identical objects; and
    g) returning the lift assembly to an initial position.

11. The method of claim 10, further comprising indexing the stack upward a distance substantially equal to or greater than a depth of the next object prior to moving the next object into the lift assembly.

12. The method of claim 10, wherein the next object is moved automatically into the lift assembly by a conveyor, feed wheels, a robotic arm and/or another automatic indexing system.

13. The method of claim 10, further comprising positioning the one or more flap guides at an angle with respect to the one or more foldably-attached parts of the next object.

14. The method of claim 10, wherein the first section is configured to allow the one or more foldably-attached parts of the next object to remain in contact with the one or more flap guides until the one or more foldably-attached parts overlap a bottom object of the stack.

15. The method of claim 10, wherein the first section is substantially vertical and the second section is at an angle of from 1° to 45° toward the next object with respect to the first section.

16. The method of claim 10, wherein the third section of the cam track is at an angle of from 1° to 45° toward the next object with respect to the angle of the second section and at an angle of less than 90° with respect to the lift assembly.

17. A method of manufacturing an apparatus for stacking objects, the method comprising:
   a) assembling at least two flap guide assemblies by:
      i) pivotally attaching a flap guide to each of one or more arms at and/or near a first end, wherein the flap guide is configured to contact a foldably-attached part of a next object and move the foldably-attached part out and/or away from a stack of substantially identical objects, and allow adjustment of the flap guide with respect to the foldably-attached part;
      ii) attaching a second end of each of the one or more arms to one or more mounting brackets; and
   b) constructing a cam by:
      i) forming in and/or attaching to at least one of the arms of each of the at least two flap guide assemblies a cam track having one or more sections, wherein the cam track comprises a first section having a first slope, a second section having a second slope that is different from the first slope, and a third section having a third slope that is different from the second slope; and
      ii) placing a cam follower in each of the cam tracks, the cam follower configured to move along the one or more sections, so as to move the one or more arms and corresponding flap guides with respect to the stack; and
   c) connecting a lift assembly having a lifting mechanism to the cam followers, wherein the lift assembly is configured to move a next object having foldably-attached parts vertically upward and facilitate upstacking the next object into the stack of objects.

18. The method of claim 17, wherein (i) the one or more mounting brackets comprise a rotatable shaft, (ii) the second end of each of the one or more arms is fixedly attached to the rotatable shaft, and (iii) the one or more arms are configured to move with the rotatable shaft.

* * * * *